Aug. 28, 1923.
R. HUDSON ET AL
1,466,399
GOVERNOR FOR FLUID PRESSURE MECHANISMS
Filed May 27, 1920
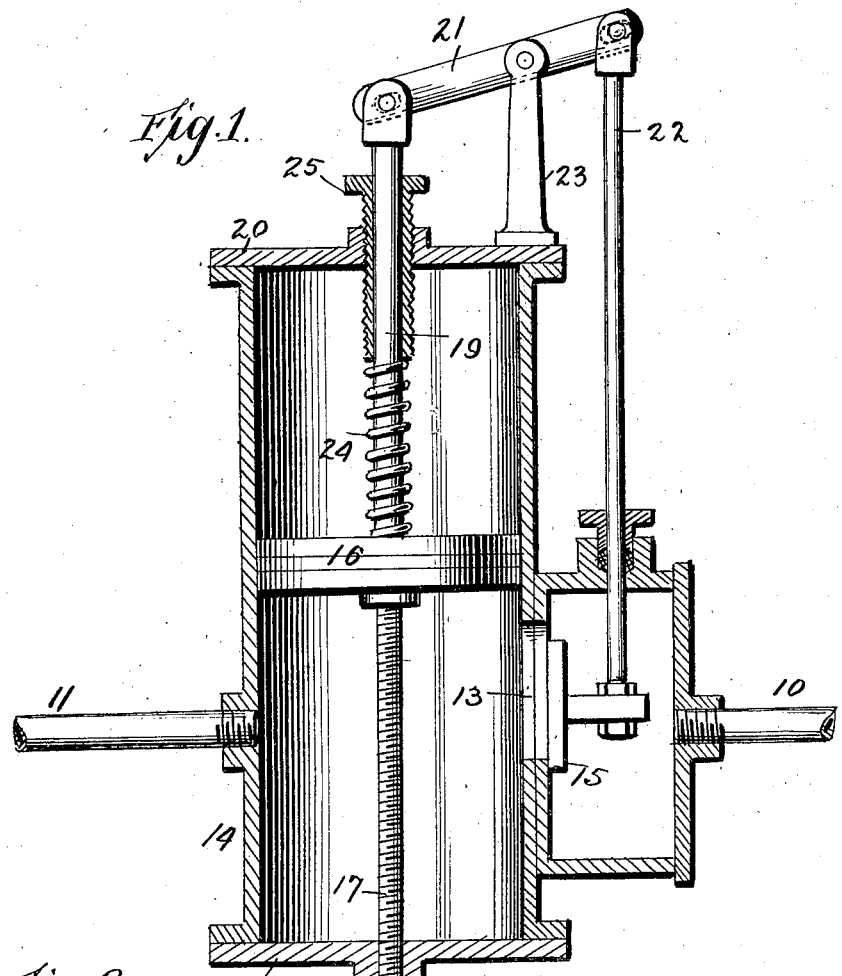
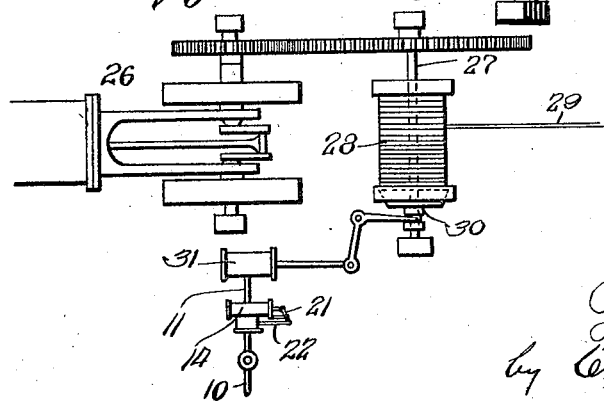

Patented Aug. 28, 1923.

1,466,399

UNITED STATES PATENT OFFICE.

RAY HUDSON, OF WALNUT RIDGE, ARKANSAS, RICHARD W. HUDSON AND FRANK N. HUDSON, OF POPLAR BLUFF, MISSOURI.

GOVERNOR FOR FLUID-PRESSURE MECHANISMS.

Application filed May 27, 1920. Serial No. 384,749.

*To all whom it may concern:*

Be it known that, we, RAY HUDSON, RICHARD W. HUDSON, and FRANK N. HUDSON, citizens of the United States, respectively residing at Walnut Ridge, Arkansas, and Poplar Bluff, Missouri, have invented certain new and useful Improvements in Governors for Fluid-Pressure Mechanisms, of which the following is a specification, reference being had therein to the accompanying drawing.

Our invention relates to mechanisms such as brakes and rams for hoisting rigs that are operated by fluid pressure, such as air or steam, and our object is to provide an automatically acting device to control the flow of pressure fluid, so that it will cause the part or member to be moved easily and smoothly without and jerking or racking strains and without impairment or diminution of the force or power that it is desired shall finally be exerted by such part or member and to this end our invention consists in the governor or power regulating device constructed substantially as defined by or included within the scope or language of the appended claims.

In the accompanying drawings Fig. 1 is a longitudinal section of a governor illustrating one embodiment and application of our invention; Fig. 2 is a top plan view showing a hoisting rig embodying our invention.

In the accompanying drawing 10 designates a pipe which in the instance shown is a steam pipe leading from a boiler and 11 is a pipe leading to the ram of a hoisting rig which is to be operated by steam from said boiler. The pipe 10 is connected with the interior of a valve chest 12 that has an outlet port 13 leading to an adjacent cylinder 14 and controlled by an ordinary slide valve 15. Within the cylinder is a piston 16 that engages the cylinder walls with a steam tight joint. The pipe 11 to the ram is connected with the cylinder 14 at a point that is never crossed by the piston 16 so that at all times there may be a free flow of steam from the port 13 to the pipe 11. The piston is limited in its movement towards port 13 and the pipe 11 by a preferably adjustable stop which may be a bolt or screw 17 passing through a threaded hole in the cylinder head 18. On the side opposite the stop 17 the piston has a piston rod 19 which passes through the other cylinder head 20 and outside the latter is connected with the slide valve so that movement of the piston 16 outward will result in proportionate movement of the slide valve to increase the opening of the port 13. The lever 21 is pivoted between its ends to a bracket 23 fixed to the cylinder head 20. Such outward movement of the piston which results in increasing the opening of the port 13 is caused by pressure in the cylinder upon the side of the piston towards the port 13. Movement of the piston in the opposite direction, and consequent closing movement of the slide valve, is produced by a spring 24 which is shown as placed upon the piston rod so that it bears at one end upon the piston and at its other end upon an adjustable nut 25 that passes through a threaded hole in the cylinder head 20 and which is made tubular for the passage through it of the piston rod 19.

The slide valve 15 is so adjusted as to give a lead or opening of the port 13 so that whenever the throttle (not shown) that controls the flow of steam through the pipe 10 is open steam may always pass from the valve chest and into the cylinder 14 and thence thru the pipe 11 to the ram.

In Fig. 2 is shown enough of a hoisting rig to illustrate our invention applied thereto, there being an engine 26 geared to a shaft, 27, on which is loosely mounted a drum, 28, for a hoisting cable, 29, a clutch 30, being provided to connect and disconnect drum and shaft, the clutch being operatively connected with the ram, 31, to which steam is supplied from pipe, 11, from the cylinder, 14, of the governor.

It will be seen that by means of our invention when the throttle is opened the full force of the steam will not be at once exerted on the ram because on entering the cylinder 14 the piston 16 will move outward so that some of the energy is exerted in that way, and the increasing resistance of the ram as it moves under the power of the steam results in further outward movement of the piston 16 which being accompanied by a progressive opening of the port 13 adds to the volume of steam entering the cylinder 14 and effectively acting on the ram so that by the time a maximum force is to be exerted steam is supplied in maximum volume.

The rams of hoisting rigs operate the clutches and brakes thereof. If the clutches are thrown on quickly so that the full power of the steam engine or other motor for running the hoisting cable or other member of the machine is instantly applied there is great danger which amounts almost to certainty that the cable or other part of the machine that is power operated will be broken. By our invention it is impossible to throw the full power of the motor on the clutch at once because by our control device the power to move the ram piston is gradually applied and at such a rate as to make damage to the driven parts impossible.

As we have already indicated our invention is applicable to air brakes and any other fluid pressure apparatus in which it is desirable to regulate the volume of fluid between the time of opening the throttle until the time it is desired to exert a maximum pressure.

What we claim is:

1. In means for controlling the application of power to a member interposed between a motor and the mechanism to be actuated by the motor, the combination of a power device for actuating said member, a source of maximum power under manual control, manual control means capable of releasing the maximum power to the motor-actuated mechanism, and automatic means in the path of power from such source to said power device so constructed when power is initially obtained from such source to deliver substantially less than the maximum power to said device and incapable of acting to deliver initially more than substantially less than the maximum power and thereafter gradually to increase the rate of delivery of power to said device.

2. In means for controlling the application of power to a member interposed between a motor and the mechanism to be actuated by the motor, the combination of a power device for actuating said member, a source of maximum power under manual control, manual control means capable of releasing the maximum power to the motor-actuated mechanism, and automatic means in the path of power from such source to said power device constructed when power is initially obtained from such source to deliver substantially less than the maximum power to said device and incapable of acting to deliver initially more than substantially less than the maximum power and thereafter gradually to increase the rate of delivery of power to said device, said automatic means including a valve chamber, a port leading from such chamber and a valve for such port that normally nearly closes the port.

3. In means for controlling the application of power to a member interposed between a motor and the mechanism to be actuated by the motor, the combination of a power device for actuating said member, a source of maximum power under manual control, and automatic means in the path of power from such source to said power device constructed when power is initially obtained from such source to deliver substantially less than the maximum power to said device and thereafter gradually to increase the quantity of power delivered to said device, said automatic means including a valve chamber, a port leading from such chamber, a valve for such port that normally nearly closes the port, a cylinder into which such port opens said cylinder having an outlet port, a piston in the cylinder, and connections between the piston and the valve by which movement of the piston acts to move the valve to increasingly open the valve controlled port as the piston moves under pressure in the cylinder.

4. Mechanism using fluid pressure having interposed between the source of pressure and the point of application thereof, a regulating device comprising a valve chamber having an inlet port and an outlet port, a valve that coacts with the outlet port, a cylinder into which said outlet port leads, said cylinder having an outlet, a piston in said cylinder movable in one direction by pressure from the valve chamber, and an operative connection between the piston and the valve that imparts such movement of the piston to the valve in the direction to increase the extent of opening of the valve chamber outlet port.

In testimony whereof we hereunto affix our signatures.

RAY HUDSON.
RICHARD W. HUDSON.
FRANK N. HUDSON.